(12) United States Patent
Lenk et al.

(10) Patent No.: US 10,041,396 B2
(45) Date of Patent: Aug. 7, 2018

(54) OVERRUN AIR RECIRCULATION VALVE FOR A COMPRESSOR OF AN INTERNAL COMBUSTION ENGINE

(71) Applicant: PIERBURG GMBH, Neuss (DE)

(72) Inventors: Martin Lenk, Neuss (DE); Oliver Paul, Gelsenkirchen (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 15/511,645

(22) PCT Filed: Sep. 15, 2015

(86) PCT No.: PCT/EP2015/071078
§ 371 (c)(1),
(2) Date: Mar. 16, 2017

(87) PCT Pub. No.: WO2016/041951
PCT Pub. Date: Mar. 24, 2016

(65) Prior Publication Data
US 2017/0298812 A1    Oct. 19, 2017

(30) Foreign Application Priority Data

Sep. 19, 2014 (DE) .......... 10 2014 113 540

(51) Int. Cl.
*F02B 37/16* (2006.01)
*F16K 27/02* (2006.01)
(Continued)

(52) U.S. Cl.
CPC .......... *F02B 37/16* (2013.01); *F16K 1/46* (2013.01); *F16K 27/029* (2013.01); *F16K 31/0655* (2013.01)

(58) Field of Classification Search
CPC .......... F02B 37/16; F16K 1/46; F16K 27/029; F16K 31/0655
(Continued)

(56) References Cited

U.S. PATENT DOCUMENTS

| 4,627,596 A | 12/1986 | Busacchi |
| 7,757,873 B2 * | 7/2010 | Thiery ............... F02B 29/0418 251/129.07 |

(Continued)

FOREIGN PATENT DOCUMENTS

| DE | 10 2005 034 939 A1 | 2/2007 |
| DE | 10 2009 011 938 B3 | 9/2010 |

(Continued)

*Primary Examiner* — Eric Keasel
(74) *Attorney, Agent, or Firm* — Norman B. Thot

(57) ABSTRACT

A divert-air valve for a compressor of an internal combustion engine includes a flow housing with a duct, an actuator, a control body moved by the actuator to control a through-flow cross section of the duct, an armature, openings in the control body, a valve housing with a housing wall, a support ring with a ring-shaped plate and a cylinder wall, and a sealing ring which seals the housing interior with respect to a part of the duct. The armature is connected to the control body. The openings fluidically connect the housing interior to a part of the duct. The valve housing surrounds the actuator and a part of the control body. The support ring bears, via the cylinder wall, radially from the outside against the housing wall. The radial sealing ring lies axially against the ring-shaped plate and bears radially at the outside against the housing wall.

8 Claims, 2 Drawing Sheets

(51) Int. Cl.
*F16K 31/06* (2006.01)
*F16K 1/46* (2006.01)

(58) Field of Classification Search
USPC ................................................ 251/129.07
See application file for complete search history.

(56) References Cited

U.S. PATENT DOCUMENTS

| | | | | |
|---|---|---|---|---|
| 7,886,760 B2* | 2/2011 | Groschel | ............... | F16K 31/06 |
| | | | | 137/315.03 |
| 8,387,383 B2* | 3/2013 | Thiery | ............... | F02B 37/16 |
| | | | | 251/129.15 |
| 8,544,816 B2* | 10/2013 | Bielass | ............... | F01D 17/145 |
| | | | | 251/129.15 |
| 2004/0041114 A1 | 3/2004 | Hirata et al. | | |
| 2007/0017587 A1 | 1/2007 | Groschel et al. | | |
| 2009/0301081 A1 | 12/2009 | Thiery et al. | | |
| 2013/0082199 A1 | 4/2013 | Matsumoto et al. | | |
| 2013/0313455 A1 | 11/2013 | Bittner | | |
| 2014/0084194 A1 | 3/2014 | Kibune | | |
| 2016/0153351 A1 | 6/2016 | Turner | | |

FOREIGN PATENT DOCUMENTS

| | | |
|---|---|---|
| DE | 10 2010 026 121 A1 | 1/2012 |
| DE | 10 2011 056 096 A1 | 6/2013 |
| DE | 10 2012 010 140 A1 | 11/2013 |
| DE | 10 2012 224 160 A1 | 6/2014 |
| EP | 1 655 465 A2 | 5/2006 |
| EP | 1 941 138 B1 | 3/2010 |
| EP | 2 405 167 A2 | 1/2012 |
| JP | 7-208631 A | 8/1995 |
| JP | 2003-269643 A | 9/2003 |
| JP | 2013-83339 A | 5/2013 |
| JP | 2014/066309 A | 4/2014 |
| KR | 10-2013-0035982 A | 4/2013 |
| KR | 10 2014 002 1978 A | 2/2014 |
| WO | WO 98/26168 A1 | 6/1998 |
| WO | WO 2007/048828 A1 | 5/2007 |
| WO | WO 2014/068765 A1 | 5/2014 |

* cited by examiner

OVERRUN AIR RECIRCULATION VALVE FOR A COMPRESSOR OF AN INTERNAL COMBUSTION ENGINE

CROSS REFERENCE TO PRIOR APPLICATIONS

This application is a U.S. National Phase application under 35 U.S.C. § 371 of International Application No. PCT/EP2015/071078, filed on Sep. 15, 2015 and which claims benefit to German Patent Application No. 10 2014 113 540.7, filed on Sep. 19, 2014. The International Application was published in German on Mar. 24, 2016 as WO 2016/041951 A1 under PCT Article 21(2).

FIELD

The present invention relates to a divert-air valve for a compressor of an internal combustion engine, comprising a flow housing in which a duct is formed, an electromagnetic actuator, a control body which can be moved by way of the actuator and via which a throughflow cross section of the duct can be controlled, a housing interior in which an armature, connected to the control body, of the electromagnetic actuator is movable, openings in the control body, via which openings the housing interior are fluidically connected to a part, which bears axially against the control body, of the duct in the flow housing, a valve housing which radially surrounds the electromagnetic actuator and a part of the axial extent of the control body, a radial sealing ring via which the housing interior is sealed off with respect to a part, which bears radially against the control body, of the duct and which lies axially against a radially inwardly facing ring-shaped plate of a support ring which, by way of a cylinder wall, bears radially from the outside against a housing wall of the valve housing.

BACKGROUND

Divert-air valves for recirculation of condensed fresh gas, optionally with recirculated exhaust gas, from the pressure side of a compressor of a turbocharger back to the suction side of the compressor, are widely known. The connection between the pressure side and the suction side of the compressor via a bypass line is required for the transition from a high load into the coasting operation of the internal combustion engine so as to prevent a high conveyance of the booster pump against a closed throttle flap and the resultant pumping effect, and to prevent a sudden drop of the turbo speed which is too strong with resulting thermodynamic problems.

Divert-air valves are frequently operated electromagnetically, wherein the valve closure body of the valve is moved via the armature by the electromagnetic force and can be lowered onto a valve seat and be lifted off therefrom, the valve seat being arranged in a flow housing between an inlet and an outlet of the compressor. Very fast switching is required in these divert-air valves because of the rapidly changing load conditions of the compressor. Divert-air valves are therefore preferably designed for equalized pressure. This is accomplished by providing openings in the control body via which the pressure applied to the control body from below will be conducted into the interior of the valve, wherein the effective diameters on both axial sides of the control body are also selected to be equal. The control body will consequently only be acted on by the force of a spring that is effective in the closing direction and by the force of the electric magnet that is effective in the opening direction. Very short opening and closing times will thereby be achieved if the design has been correctly designed. To establish such a pressure compensation, it is required that, at least in the closed state of the valve, the intervening space between the moving control body and the surrounding housing is sealed. This is realized by radial or axial sealing rings that are supported on a surface of the housing.

Such a valve is described, for example, in DE 10 2010 026 121 A1. The electromagnetic actuator of this divert-air valve is surrounded by a plastic housing which bears against a connection housing formed with an annular recess into which a further plastic housing portion, serving as a support ring, is inserted, the plastic housing portion surrounding the control body and accommodating a radial sealing ring with a V-shaped cross section. Care must be taken to maintain precise tolerances when producing the housing portion in order to be able to mount the support ring on the connection housing. The support ring comprises a form-locking connection to the connection housing in the region of the annular recess to prevent the housing components from falling apart during transport. Although this will facilitate the assembly process, it has the consequence that, via the gap between these components, gas may intrude from the housing interior into the laterally connected duct. Such a gas flow will also have the consequence that contaminated gas also intrudes into the gap. This might result in caking effects that will render it considerably difficult to remove a valve. Due to their low thermal resistance, the plastic parts used also tend to cause an increased sooting of the valve. Expensive plastic parts must alternatively be used.

SUMMARY

An aspect of the present invention is to provide a divert-air valve which can be easily mounted and demounted, which is highly insensitive to sooting, and which is thermally resistant. An aspect of the present invention is also to provide a divert-air valve which avoids a gas flow via a gap between the two duct portions that must be separated from each other. Another aspect of the present invention is to provide a divert-air valve whose production costs are lower.

In an embodiment, the present invention provides a divert-air valve for a compressor of an internal combustion engine which includes a flow housing comprising a duct formed therein, an electromagnetic actuator, a control body configured to be moved by the electromagnetic actuator and to control a throughflow cross section of the duct, a housing interior, an armature arranged in the housing interior, openings arranged in the control body, a valve housing comprising a housing wall, a support ring comprising a radially inwardly facing ring-shaped plate and a cylinder wall, and a radial sealing ring configured to seal off the housing interior with respect to a part of the duct which bears radially against the control body. The armature is connected to the control body so as to be movable. The openings are configured to fluidically connect the housing interior to a part of the duct in the flow housing which bears axially against the control body. The valve housing is configured to radially surround the electromagnetic actuator and a part of an axial extent of the control body. The support ring is configured to bear, via the cylinder wall, radially from the outside against the housing wall. The radial sealing ring is arranged to lie axially against the radially inwardly facing ring-shaped plate of the support ring and to bear radially at the outside against the housing wall of the valve housing.

BRIEF DESCRIPTION OF THE DRAWINGS

The present invention is described in greater detail below on the basis of embodiments and of the drawings in which.

DETAILED DESCRIPTION

Figure 1:
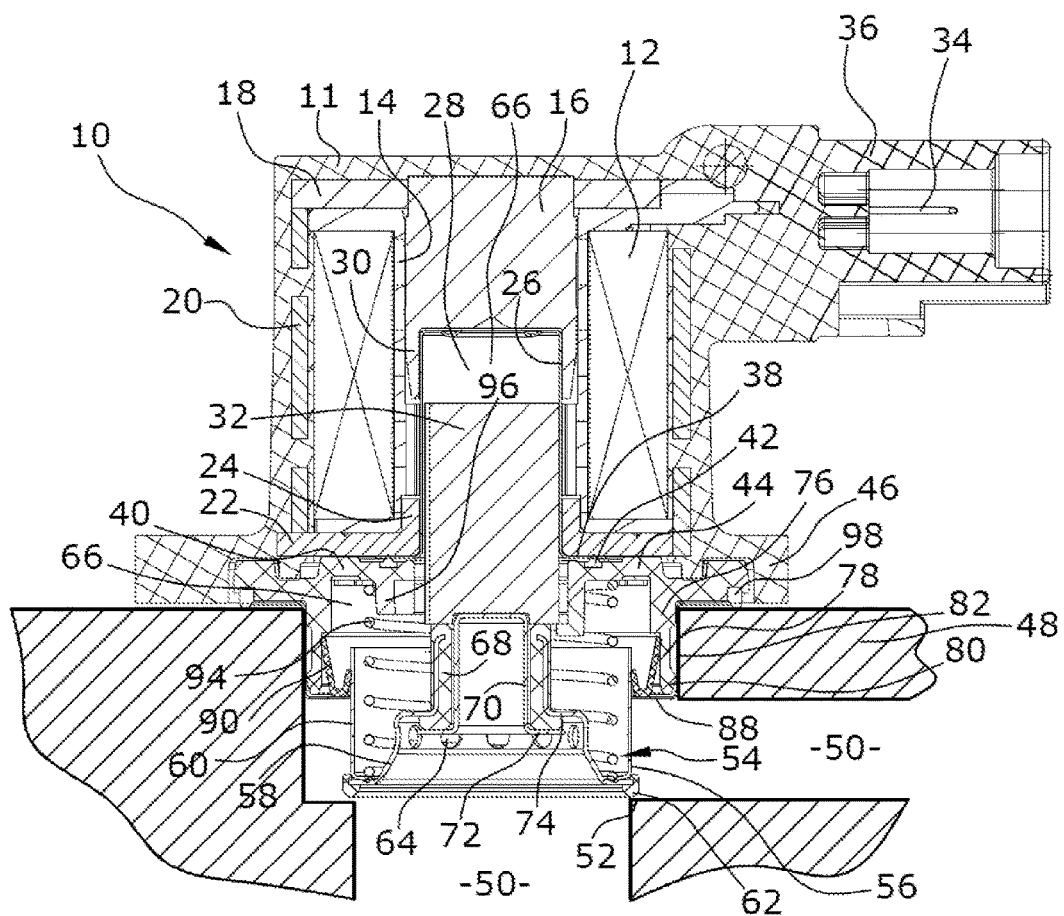
FIG. 1 shows a sectional lateral view of a divert-air valve according to the present invention.

Since the radial sealing ring bears radially at the outside against the housing wall of the valve housing, it is achieved that no gap exists between the support ring and the valve housing that is accessible to the gas flow from the side of the housing interior. A gas flow through this gap is therefore avoided without additional components. In the assembly process, the radial sealing ring can initially be inserted, with the support ring then being shifted over the housing wall. No narrow tolerances need to be observed in this process so that costs will be lowered and the sooting of the valve during operation reduced.

In an embodiment of the present invention, the support ring can, for example, comprise a cylinder wall which surrounds the housing wall of the valve housing, and, at the end facing toward the actuator, a radially outward-facing annular plate extends from the cylinder wall of the support ring, the annular plate being axially clamped between the valve housing and the flow housing. The support ring accordingly has a shape which can be produced in a very simple and cost-effective manner.

In an embodiment of the present invention, it is provided that, at the axial the end of the cylinder wall facing away from the actuator, the support ring can, for example, comprise an annular, radially inward-facing plate whose inner diameter is slightly larger than the outer diameter of the control body and which has the radial sealing ring resting thereon. This means that the support ring is designed to be substantially pot-shaped while having a partially open bottom, wherein the support ring can be produced from any desired materials without high costs for tools.

In an embodiment of the present invention, the support ring can, for example, be a deep-drawn component made of metal. Such a deep-drawn component can be produced in a very cost-effective manner. The metal also has a high thermal resistance and is insensitive to sooting.

In an embodiment of the present invention, the height of the cylinder wall of the support ring can, for example, be slightly larger than the housing wall of the valve housing facing away from the actuator. This provides that the upper plate bears against the valve housing with resultant leak tightness.

A sealing ring is clamped between the flow housing and the valve housing outside of the radially outward-facing annular plate in order to prevent a flow into the outer region from the duct arranged radially adjacent to the control body.

In an embodiment of the present invention, the support ring can, for example, be fastened to the valve housing via the housing wall. This allows for a complete pre-assembly and for transport of the completely assembled but not installed valve.

In an embodiment of the present invention, the cylinder wall of the support ring can, for example, bear against a widened portion of the valve housing so as to generate a clamping force serving for fastening at its end axially facing away from the actuator. Because of this clamping force, the divert-air valve can be transported and inserted into the flow housing in a fully pre-assembled state because a loss of the support ring is avoided.

In an embodiment of the present invention, a constriction can, for example, be formed which is resiliently deformable on the valve housing between the widened portion and the actuator. The clamping force for the support ring can be made available in a simple manner via this slight deformabilty.

There is thus provided a divert-air valve for a compressor of an internal combustion engine wherein a gas flow along the gap between the valve housing and the support ring of the radial sealing ring is reliably avoided without the need for additional component parts. This will increase the sealing tightness between the two duct portions of the flow housing that must be separated from each other. Such a valve can also be produced and assembled in a cost-effective manner while a complete pre-assembly is also possible for transport of the valve. The divert-air valve is thermally resistant and only has a slight tendency to soot.

An exemplary embodiment of a divert-air valve for a compressor of an internal combustion engine according to the present invention is illustrated in the drawings and will be described hereunder.

The divert-air valve according to the present invention as shown in FIG. 1 comprises an electromagnetic actuator 10 having an actuator housing 11 in which a coil 12 is arranged on a coil carrier 14. In the radially inner region of coil carrier 14, a magnetizable core 16 is fastened whose axial end extends beyond coil carrier 14, wherein, on this axial end, the core 16 is surrounded by a first return plate 18 which is arranged in connection with a yoke 20 surrounding coil 12. On the end of coil carrier 14 opposite core 16, a second return plate 22 is arranged which in the radially outer region is in contact with yoke 20 and which comprises an inner axial extension portion 24 extending into coil carrier 14.

In the radial interior of the inner axial extension portion 24, a guide sleeve 26 is arranged that extends all the way until entering a central recess 28 of core 16 which is surrounded by a radially outer, axially extending annular projection 30 of core 16 and in which an armature 32 is supported. The coil 12 is supplied with power via conduits 34 leading into a plug 36.

On the side facing away from core 16, a radially outward-facing collar 38 of guide sleeve 26 axially bears against the flat side (extending in the direction of yoke 20) of the second return plate 22. Collar 38 and, along therewith, the entire guide sleeve 26, is pressed, with interposition of a first sealing ring 42, against second return plate 22 via a connection housing 40 which is fastened to actuator housing 11 and which together with actuator housing 11 forms a valve housing of the divert-air valve so that a gap between second return plate 22 and connection housing 40 is sealed toward the outside.

Connection housing 40 comprises a substantially plate-shaped base body 44 formed with an inner circular recess having the armature 32 extending therethrough via which the connection housing 40 bears on the actuator housing 11, and which has a radially outer annular projection 46 of actuator housing 11 gripping therearound. This annular projection 46 serves to fasten the divert-air valve to a flow housing 48 on which there are formed a duct 50, whose through-flow cross section can be controlled by the divert-air valve, and a valve seat 52. A control body 54 rests on valve seat 52 in the closed state of the valve.

Control body 54 comprises a first hollow body 56 and a second hollow body 58 which is arranged in the radial interior of the first hollow body 56 and which is fixedly connected to first hollow body 56. The first hollow body 56 comprises a cylindrical outer surface 60 which is closed along its circumference, wherein, via said outer surface 60, the portion of duct 50 radially bearing on outer surface 60 is separated from the portion of duct 50 axially bearing on control body 54 when the control body 54, by way of its seal 62, which is fastened on the end of control body 54 axially facing away from armature 32, rests on valve seat 52. The effective diameter of seal 62 for placement on valve seat 52 corresponds to the diameter of the cylindrical outer surface 60 of the first hollow body 56. Ten openings 64 are formed in second hollow body 58 via which the axially abutting portion of duct 50 is continuously fluidically connected to a housing interior 66 that is delimited by the first hollow body 56, the connection housing 40, and the guide sleeve 26, so that the cross-sectional area which is acted on by the pressure in the housing interior 66 in the closing direction of the divert-air valve is equal to the cross sectional area of the control body 54 which is acted on by the pressure in the opening direction of the divert-air valve.

A cylindrical portion of second hollow body 58 facing toward armature 32 has an elastomer 68 molded around it which bears axially against the armature 32. To fasten the control body 54 to the armature 32, use is made of a connection element 70 which is fastened to armature 32 and is arranged substantially radially within the elastomer 68. On the side opposite to armature 32, the connection element 70 comprises a radially widened portion 72 which bears axially against the elastomer 68 whose axially opposite end bears against a constriction 74 of second hollow body 58 so that the latter and, along therewith, the first hollow body 56 is fastened to the armature 32 and is moved together with the armature 32. To further safeguard that, in a non-powered condition of coil 12, the control body 54 is placed into its state resting on valve seat 52, a helical spring 94 is arranged in the interior of the first hollow body 56, the helical spring 94 resting in a tensioned state against the first hollow body 56 and, by its opposite axial end, bearing against base body 44 of connection housing 40. Helical spring 94 is held radially in its position by an annular projection 96 of connection housing 40 that extends axially in the direction of control body 54. Annular projection 96 has an outer diameter which is slightly smaller than the inner diameter of helical spring 94 therefor.

Connection housing 40 comprises an axially extending annular housing wall 76 which radially delimits the connection housing 40 in this axial section. On its radial outer side, housing wall 76 comprises an annular radial constriction 78 which, on the end axially facing away from actuator housing 11, is followed by a widened portion 80.

According to the present invention, housing wall 76 is radially surrounded by a support ring 82 which comprises a cylinder wall 84 tightly bearing on widened portion 80. Constriction 78 in this arrangement has the function of allowing for a slight resilient deformation of housing wall 76 in this region, thus making it easier to slide the support ring into place while the widened portion 80 exerts a clamping force onto support ring 82 so that the support ring 82 does not need to be additionally fastened even during transport.

Figure 2:
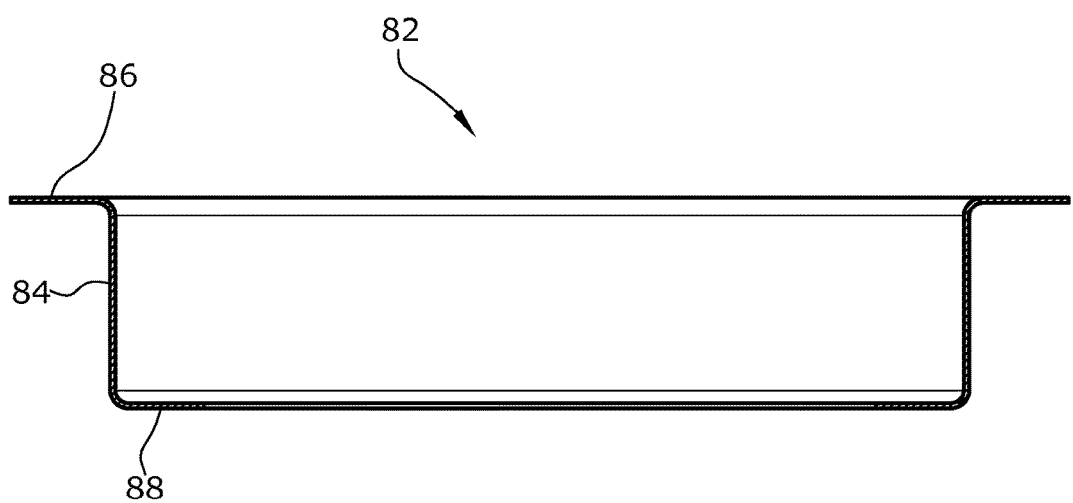
FIG. 2 shows a sectional lateral view of a support ring of the divert-air valve according to the present invention shown in FIG. 1.

As can in particular be seen in FIG. 2, the end of cylinder wall 84 of support ring 82 that faces toward actuator housing 11 is followed by a radially outward-facing annular plate 86 which bears tightly against the base body 44 of connection housing 40 and which, when the divert-air valve is fastened to flow housing 48, reliably prevents the support ring 82 from falling out and which additionally acts as a sealing. On the radially opposite end, support ring 82 comprises an annular, inward-facing plate 88 whose inner diameter is slightly larger than the outer diameter of control body 54 which radially surrounds the control body accordingly. A radial sealing ring 90 is axially supported on this annular, inward-facing plate 88, the radial sealing ring 90 having a V-shaped cross section and comprising two legs, wherein one of these legs radially bears against the circumferentially closed outer surface 60 of control body 54 and, as provided by the present invention, the second leg radially bears against the radially delimiting housing wall 76 so that, in the closed state of the valve, the housing interior 66 is connected to the axially extending part of duct 50 exclusively via the openings 64 and, in this state, the radially extending part of duct 50 is completely sealed toward the housing interior 66. This is in particular achieved by the abutment of the radial sealing ring 90 on housing wall 76 because, in this manner, no contaminated gas can leak from the housing interior 66 into the gap between support ring 82 and housing wall 76. The tight abutment of the cylinder wall 84 on the widened portion 80 acting as a clamping surface, as well as the large abutment surface of annular plate 86 on connection housing 40, also have a reliable sealing effect. Due to its simple shape, the support ring 82 is produced in an inexpensive manner as a deep-drawn part from a metal sheet and is thus thermally resistant. Such a metal part also has no increased sooting tendency which is to be feared due to the entrained oils and the possibly existing exhaust gas in the conveyed gas flow.

A second sealing ring 98 is arranged on base body 44 between flow housing 48 and connection housing 40 immediately radially outside the annular plate 86 of support ring 82 which, when the divert-air valve is fastened, will be elastically deformed with sealing effect by actuator housing 11. Second sealing ring 98 provides that no gas or other contaminants or oils can leak into an outer region through the gap between sealing ring 82 and connection housing 40.

There is thus provided a divert-air valve wherein a reliable sealing exists between the support ring supporting the sealing ring and the valve housing. The valve can be produced and mounted in a simple and inexpensive manner and has a low tendency to soot. The valve can also be entirely pre-assembled prior to transport.

It should be evident that the scope of protection of the present invention is not restricted to the described exemplary embodiment. The division and design of the housing parts of the valve housing comprising the actuator housing and the connection housing may in particular be subject to variations, This also applies to the design and the attachment of the control body to the armature. Reference should also be had to the appended claims.

The invention claimed is:

1. A divert-air valve for a compressor of an internal combustion engine, the divert-air valve comprising:
   a flow housing comprising a duct formed therein, the duct comprising a throughflow cross section;
   an electromagnetic actuator;
   a control body configured to be moved by the electromagnetic actuator and to control the throughflow cross section of the duct, the control body comprising an axial extent;
   a valve housing comprising a housing wall and a housing interior, the valve housing being configured to radially surround the electromagnetic actuator and a part of the axial extent of the control body;

an armature arranged in the housing interior of the valve housing, the armature being connected to the control body so as to be movable;

openings arranged in the control body, the openings being configured to fluidically connect the housing interior to a part of the duct in the flow housing which bears axially against the control body;

a support ring comprising a radially inwardly facing ring-shaped plate and a cylinder wall, the support ring being configured to bear, via the cylinder wall, radially from the outside against the housing wall; and a radial sealing ring configured to seal off the housing interior with respect to a part of the duct which bears radially against the control body, the radial sealing ring being arranged to lie axially against the radially inwardly facing ring-shaped plate of the support ring and to bear radially at the outside against the housing wall of the valve housing, wherein, the cylinder wall of the support ring is configured to surround the housing wall of the valve housing, the cylinder wall comprising a radially outward-facing annular plate at an end facing toward the electromagnetic actuator which is axially clamped between the valve housing and the flow housing.

2. The divert-air valve as recited in claim 1, further comprising a sealing ring which is clamped between the flow housing and the valve housing radially outside the radially outward-facing annular plate.

3. The divert-air valve as recited in claim 2, wherein the support ring is fastened to the valve housing via the housing wall.

4. The divert-air valve as recited in claim 3, wherein,
the valve housing further comprises a widened portion, and
the cylinder wall, at its end axially facing away from the electromagnetic actuator, bears against the widened portion of the valve housing so as to generate a clamping force which serves as a fastening.

5. The divert-air valve as recited in claim 4, wherein the valve housing further comprises a constriction formed thereon between the widened portion and the electromagnetic actuator, the constriction being configured to be resiliently deformable.

6. The divert-air valve as recited in claim 1, wherein,
the control body further comprises an outer diameter, and
the support ring further comprises an annular, radially inward-facing plate at an axial end of the cylinder wall facing away from the electromagnetic actuator, the annular, radially inward-facing plate comprising an inner diameter which is slightly larger than the outer diameter of the control body, the annular, radially inward-facing plate being configured to have the radial sealing ring rest thereon.

7. The divert-air valve as recited in claim 1, wherein the support ring is a deep-drawn component made of metal.

8. The divert-air valve as recited in claim 1, wherein,
the cylinder wall of the support ring comprises a height,
the housing wall of the valve housing facing away from the electromagnetic actuator comprises a height, and
the height of the cylinder wall is slightly larger than the height of the housing wall of the valve housing facing away from the electromagnetic actuator.

* * * * *